United States Patent
Mixter

(10) Patent No.: US 9,232,001 B1
(45) Date of Patent: Jan. 5, 2016

(54) CLIENT-SERVER COMMUNICATION USING A SET IDENTIFIER

(75) Inventor: Kenneth Edward Mixter, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 471 days.

(21) Appl. No.: 13/570,196

(22) Filed: Aug. 8, 2012

Related U.S. Application Data

(60) Provisional application No. 61/556,086, filed on Nov. 14, 2011.

(51) Int. Cl.
*G06F 15/177* (2006.01)
*H04L 29/08* (2006.01)
*H04L 29/06* (2006.01)
*G06F 11/14* (2006.01)
*G06F 21/60* (2013.01)
*G06F 21/62* (2013.01)

(52) U.S. Cl.
CPC ........ *H04L 67/1023* (2013.01); *G06F 11/1433* (2013.01); *G06F 21/606* (2013.01); *G06F 21/6254* (2013.01); *H04L 63/0407* (2013.01); *H04L 63/065* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 6,697,851 B1 * | 2/2004 | Althaus et al. | 709/220 |
| 6,801,998 B1 * | 10/2004 | Hanna et al. | 713/155 |
| 6,959,288 B1 * | 10/2005 | Medina et al. | 705/51 |
| 7,155,487 B2 * | 12/2006 | Yau et al. | 709/213 |
| 7,991,912 B2 * | 8/2011 | Manapragada et al. | 709/240 |
| 8,316,237 B1 * | 11/2012 | Felsher et al. | 713/171 |
| 8,676,994 B2 * | 3/2014 | Manapragada et al. | 709/227 |
| 2005/0132348 A1 * | 6/2005 | Meulemans et al. | 717/168 |
| 2009/0070417 A1 * | 3/2009 | Bao et al. | 709/203 |
| 2009/0222508 A1 * | 9/2009 | Hubbard | 709/202 |
| 2009/0300164 A1 * | 12/2009 | Boggs et al. | 709/224 |
| 2009/0300723 A1 * | 12/2009 | Nemoy et al. | 726/4 |
| 2010/0031042 A1 * | 2/2010 | Di Crescenzo et al. | 713/169 |
| 2010/0217793 A1 * | 8/2010 | Preiss | 709/203 |
| 2012/0089713 A1 * | 4/2012 | Carriere | 709/222 |
| 2012/0221854 A1 * | 8/2012 | Orsini et al. | 713/167 |

* cited by examiner

*Primary Examiner* — Mohamed Ibrahim
*Assistant Examiner* — James Fiorillo
(74) *Attorney, Agent, or Firm* — McDermott Will & Emery LLP

(57) ABSTRACT

Systems, methods, and machine-readable media for client-server communication using a set identifier are provided. A system may be configured to receive a set identifier from a client machine, wherein the set identifier is based on the client identifier of the client machine, generate a communication based on the set identifier from the client machine, wherein the communication comprise a number of references to client identifiers associated with the set identifier, and transmit the communication to the client machine.

20 Claims, 6 Drawing Sheets

100

| | |
|---|---|
| [Hash for Client ID 1] | [Message for Client ID 1] |
| [Hash for Client ID 2] | [Message for Client ID 2] |
| [Hash for Client ID 3] | [Message for Client ID 3] |
| [Hash for Client ID 4] | [Message for Client ID 4] |
| [Hash for Client ID 5] | [Message for Client ID 5] |
| [Hash for Client ID 6] | [Message for Client ID 6] |
| [Hash for Client ID 7] | [Message for Client ID 7] |
| [Hash for Client ID 8] | [Message for Client ID 8] |
| [Hash for Client ID 9] | [Message for Client ID 9] |
| [Hash for Client ID 10] | [Message for Client ID 10] |
| [Hash for Client ID 11] | [Message for Client ID 11] |
| . . . | |

[Hash for Client ID 1]
[Hash for Client ID 2]
[Hash for Client ID 4]
[Hash for Client ID 6]
[Hash for Client ID 7]
[Hash for Client ID 9]
[Hash for Client ID 10]
[Hash for Client ID 19]
[Hash for Client ID 22]
[Hash for Client ID 25]

350

FIG. 3B

# CLIENT-SERVER COMMUNICATION USING A SET IDENTIFIER

RELATED APPLICATION

This application claims priority to U.S. provisional patent application 61/556,086, filed on Nov. 4, 2011, "SYSTEM AND METHOD FOR CLIENT-SERVER COMMUNICATION USING A SET IDENTIFIER," the contents of which are herein incorporated by reference in its entirety.

BACKGROUND

Client machines and server machines communicate with each other using various protocols. In some instances, users of client machines and server administrators may wish to protect certain aspects of a user's privacy. For example, in order to remain anonymous to the server, it may be desirable for the client machine to communicate with the server without sending identifying information that may be used to identify the client machine. In other instances, it may also be useful to be able to transmit client specific information to a particular client machine. However, there may be difficulties in providing client specific information to a client machine without identifying the client machine to the server.

SUMMARY

Aspects of the subject technology relate to a system for using a set identifier to anonymously transmit instructions to a client device. The system may include one or more processors and a machine-readable medium comprising instructions stored therein, which when executed by the one or more processors, cause the one or more processors to perform operations. The operations may include retrieving a client identifier for a client device, calculating a hash value for the client identifier by performing a hashing function, generating a modulus result by performing a modulus operation on the hash value, and assigning the hash value or the client identifier to a predefined set identifier that corresponds to the modulus result. The set identifier may be used to transmit instructions in response to receiving a request for instructions, and wherein the instructions are transmitted together with a number of hash values or a number of client identifiers for respective client devices assigned to the set identifier.

Aspects of the subject technology relate to a method for using a set identifier to anonymously transmit configuration instructions to a client device. The method may include retrieving a client identifier for a client device, calculating a hash value for the client identifier by performing a hashing function, generating a modulus result by performing a modulus operation on the hash value, and assigning the hash value or the client identifier to a predefined set identifier that corresponds to the modulus result. The set identifier may be used to transmit configuration instructions to the client device in response to receiving a request for configuration instructions, and wherein the configuration instructions are transmitted together with a number of hash values or a number of client identifiers for respective client devices assigned to the set identifier.

Other aspects of the subject technology relate to a machine-readable medium that includes instructions stored therein, which when executed by a machine, cause the machine to perform operations for communicating using a set identifier. The operations may include retrieving a client identifier for a client device, calculating a hash value for the client identifier by performing a hashing function, generating a modulus result by performing a modulus operation on the hash value, and assigning the hash value or the client identifier to a predefined set identifier that corresponds to the modulus result. The set identifier may be used to transmit a communication in response to receiving a request for a communication, and wherein the communication comprises a number of hash values or a number of client identifiers assigned to the set identifier.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

FIG. 3A is a diagram illustrating an example communication generated based on a set identifier, in accordance with one aspect of the subject technology.

FIG. 3B is a diagram illustrating an example communication generated based on a set identifier, in accordance with one aspect of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

According to various aspects of the subject technology, systems and methods for client-server communication using a set identifier are provided. The set identifier may be a string of characters that is used by a server machine to identify a set (e.g., a group) of client identifiers. In one aspect, the client machine may use the set identifier when communicating with the server machine instead of an identifier for the client machine (e.g., a machine serial number) or an identifier for a user (e.g., a user name). Accordingly, at most, the server machine may receive information that may be used to determine that the client machine is associated with one of the client identifiers in a particular set of client identifiers on the server machine.

The server machine may be configured to generate a reply to the client machine based on the set identifier provided by the client machine. For example, the server may generate a reply including information that may be used by one or more of the entities associated with a client identifier assigned to the set identifier. In one aspect, the reply may include messages directed towards entities associated with specific client identifiers.

Figure 1:
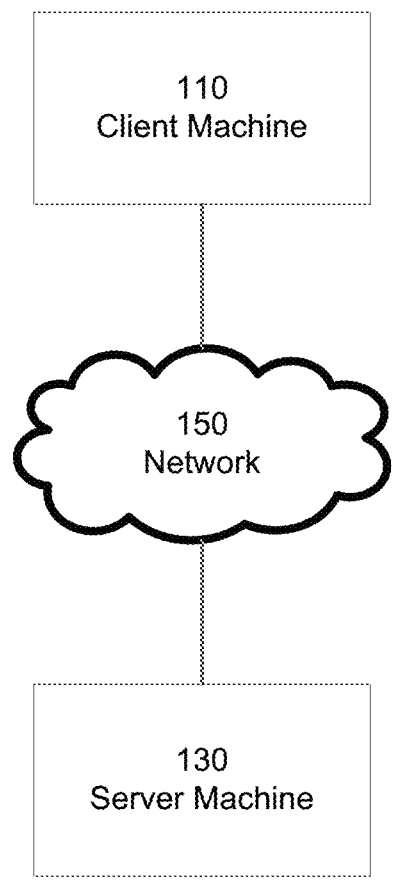
FIG. 1 is a block diagram illustrating an example network environment in which aspects of the subject technology may be implemented, in accordance with one aspect of the subject technology.

FIG. 1 is a block diagram illustrating an example network environment 100 in which aspects of the subject technology may be implemented, in accordance with one aspect of the subject technology. Although FIG. 1 illustrates a client-server network environment 100, other aspects of the subject technology may include other configurations including, for example, peer-to-peer environments. The network environment includes one or more client machines 110 that are connected to one or more server machines 130 via a network 150 (e.g., the Internet).

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The client machines 110 may be any machines capable of communicating with the server machine (server) 130 via the network 150. For example, client machine 110 may be a desktop computer, a laptop, a mobile device (e.g., a smart phone, tablet, personal digital assistant (PDA), a global positioning system (GPS) device, etc.), or any other machine with a processor, memory, and communications capabilities. Each client machine may also include one or more modules that may be configured retrieve or generate a set identifier and communicate with the server 130. The modules may be, for example, applications, a operating system component, firmware, hardware, or a combination.

The server 130 may be any system or device having a processor, a memory, and communications capability that may be used to communicate with one or more client machines 110 or other servers. In one aspect, the server 130 may receive communications from a client machine 110 that includes a set identifier, generate a response to the client machine based on the set identifier, and transmit the response to the client machine 110. One example server 130 is discussed with respect to FIG. 2 below.

Figure 2:
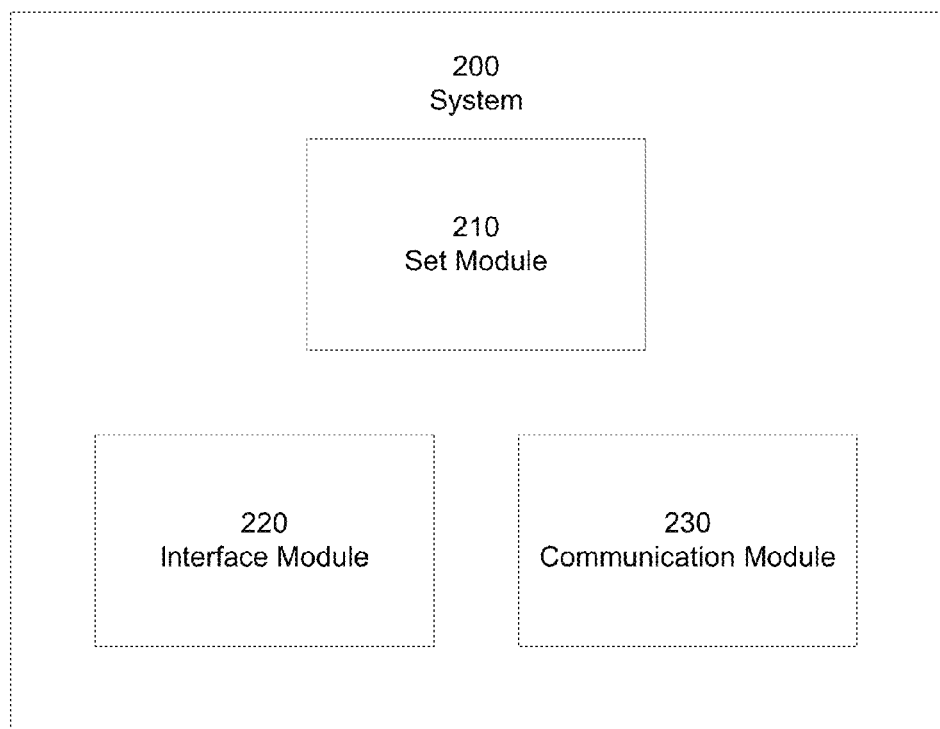
FIG. 2 is a block diagram illustrating an example system configured to generate a reply to a client machine based on a set identifier, in accordance with various aspects of the subject technology.

FIG. 2 is a block diagram illustrating an example system 200 configured to generate a reply to a client machine based on a set identifier, in accordance with various aspects of the subject technology. The system 200 may be embodied in, for example, the server machine 130 of FIG. 1 and may include a set module 210, an interface module 220, and a communication module 230. While the system 200 is shown in one configuration in FIG. 2, in other configurations, the system 200 may include additional, alternative, and/or fewer components.

The set module 210 may be configured to keep track of associations between client identifiers and sets. For example, the set module 210 may store a record, for each set, that includes a reference to the client identifiers in the set. The set module may also, or instead, store a record, for each client identifier, that includes a reference to a set identifier for the set that the client identifier is associated with.

According to one aspect, the set module 210 may obtain a list of client identifiers (e.g., identification numbers, serial numbers, client names, or other identifiers for the client machines or users) and assign some or all of the client identifiers to one or more sets. The set module 210 may assign a client identifier to a set by, for example, calculating a hash of the client identifier by running a hash function on the client identifier and performing a modulus operation on the hash of the client identifier based on the number of sets available. The resulting number may correspond to a set that the client identifier is to be assigned to or associated with.

Any number of hash functions may be used. For example, the set module may use a secure hash function (e.g., SHA-0, SHA-1, SHA-2, SHA-3, etc.) of varying block sizes (e.g., SHA-256 using 256 bits, SHA-512 using 512 bits, etc.) or any other cryptographic hash function.

The interface module 210 may be configured to communicate with one or more client machines or servers. For example, the interface module may receive a communication that includes a set identifier from a client machine. In response to receiving the communication from the client machine, the communication module 230 may generate a response to the to the client machine based on the set identifier.

The response may include a message or other information that is appropriate for all client machines associated with the set identifier to receive. For example, the client machines associated with the set identifier may be a particular group of client machines that share one or more characteristics. The communication module 230 may generate and transmit a message to the client machines based on the one or more characteristics.

In another aspect, the client machines may be assigned to set identifiers randomly (e.g., the members of the set may not have any logical connection to one another) and the communication module 230 may generate a message to client machines associated with a particular set identifier. In such cases, the response may contain a potentially different message directed to each client machine associated with the set identifier.

In another aspect, the communication module 230 may generate and transmit messages directed towards a subset (e.g., one or more, but not all) of the client machines associated with the set identifier. Additional aspects of communications (e.g., responses) to client machines are discussed below with respect to FIG. 3A and FIG. 3B.

FIG. 3A is a diagram illustrating an example communication 300 generated based on a set identifier, in accordance with one aspect of the subject technology. The communication 300 may be sent to a client machine as a response or reply to a request that includes a set identifier received from the client machine. As discussed above, the set identifier in the request may be associated with a number of client identifiers.

The communication module 230 may generate a communication 300 that includes one or more messages that correspond to one or more of the client identifiers associated with the set identifier. In order to prevent a third-party that intercepts the communication 300 from determining the client identifiers included in the communication 300, the communication 300 may include a hash for the client identifier instead of the client identifier itself. This may also prevent third-parties from determining which messages are directed towards which client identifiers in the communication 300.

When the client machine receives the communication 300, the client machine may identify the message directed to the client machine and use the message for another application or process. For example, the client machine may compute a hash for its client identifier (e.g., the serial number of the client machine) using the same hash algorithm as the communication module 230 and look for the computed hash in the communication 300. If the computed hash is found, the client machine may take the message that corresponds to the hash and use the message in additional operations.

In one aspect, the communication 300 may include messages for client machines associated with client identifiers in the set that may be used to configure a client machine. For example, a message may include an indication a configuration type that a client machine is to be configured to operate as. When a client machine receives the communication, the client machine may identify a configuration type in a message directed to the client machine based on its client identifier and execute one or more configuration processes based on the configuration type.

According to one aspect, a message corresponding to an entity (e.g., a client machine) associated with a particular client identifier included in the communication 300 may be encrypted using an encryption key that is available to the entity associated with the client identifier. Accordingly, other parties that obtain the communication 300 may not be able to decipher the message. Instead, only the entity associated with the client identifier with access to the encryption key may be able to decrypt the message and use the message in additional operations.

The communication to the client machine need not include messages to client machines associated with the set identifier. For example, FIG. 3B is a diagram illustrating an example communication 350 generated based on a set identifier, in accordance with one aspect of the subject technology. The communication 350 may be generated based on a request from a client machine and may include a listing of one or more client identifiers associated with the set identifier or hashes for the one or more client identifiers.

According to one aspect, the one or more client identifiers may be a subset of all of the client identifiers associated with the set identifier that are selected based on, for example, one or more characteristics associated with the client identifiers. For example the communication 350 may include hashes for client identifiers that are of a certain configuration type (e.g., enterprise client machines, personal client machines, professional edition, limited edition, etc.).

When a client machine receives the communication 350, the client machine may determine whether the hash for the client machine's client identifier (e.g., serial number) is listed in the communication 350. Based on whether or not the hash for the client machine's client identifier is in the communication 350, the client machine may be configured to perform one or more operations.

For example, if the hash is found in the communication 350, the client machine may determine that the client machine is of a particular configuration type (e.g., enterprise client machine) and execute one or more operations or processes associated with that particular configuration type (e.g., configuration processes). Accordingly, the client machine may run one or more processes designed to configure the client machine to operate as the particular configuration type of machine (e.g., enterprise client machine).

If the hash is not found in communication 350, the client machine may determine that the client machine is not of a particular configuration type (e.g., enterprise client machine) or of another configuration type (e.g., personal client machine) and execute other operations or processes. Accordingly, the client machine may run other processes designed to configure the client machine to operate as another configuration type of machine (e.g., a default configuration type).

Figure 4:
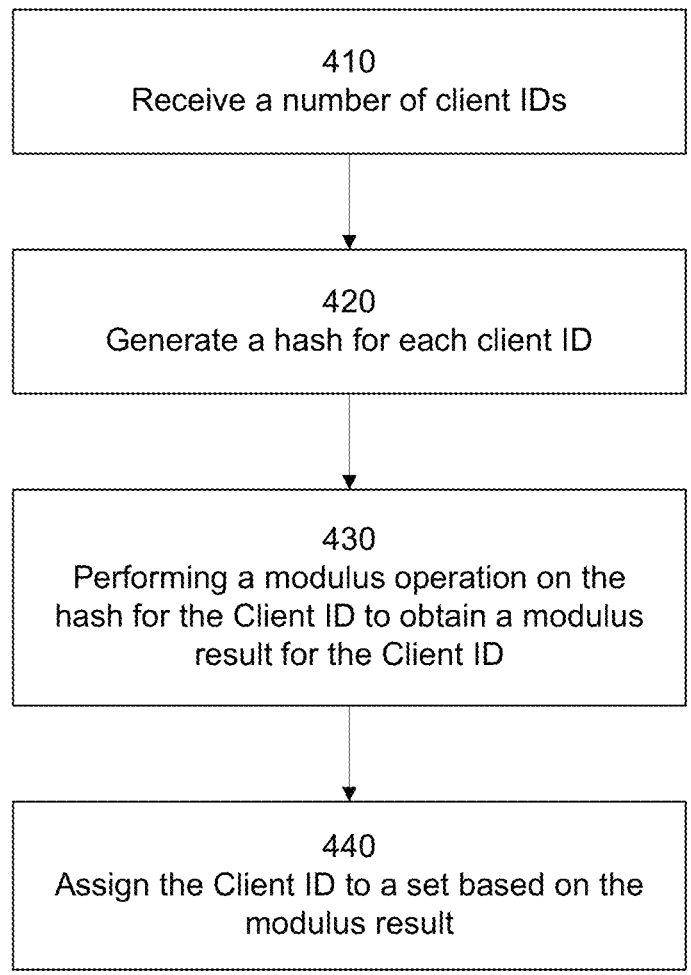
FIG. 4 is a flow diagram illustrating an example process for assigning client identifiers to a set, in accordance with one aspect of the subject technology.

FIG. 4 is a flow diagram illustrating an example process 400 for assigning client identifiers to a set. Although the steps in process 400 are shown and described in a particular order, certain steps, including steps not shown, may be performed in different orders or at the same time.

At step 410, the server machine may receive a number of client identifiers (e.g., client IDs) to be assigned to sets. The client identifiers may be, according to one aspect, client identifiers for all client machines that have been purchased or for client machines of a certain type (e.g., a enterprise machine that is to be configured in a specific manner).

To assign each of the client identifiers to a set, the server machine may generate a hash for each client identifier at step 420 by applying a hash function to the client identifier. At step 430, the server machine may perform a modulus operation on the hash of each client identifier based on the number of sets that are to have client identifiers assigned to them.

The modulus operation on the hash for a client identifier may result in a modulus result for the client identifier that, at step 440, may be used to assign the client identifier to a set. For example, the server machine may assign the client identifier to a set that has a set identifier (e.g., a set ID) that corresponds to the modulus result for the client identifier. In one aspect, the client identifier is assigned to the set by storing an association of the client identifier with the set identifier of the set in a data repository. The stored association may then be used in communications between the client machine and the server machine.

Figure 5:
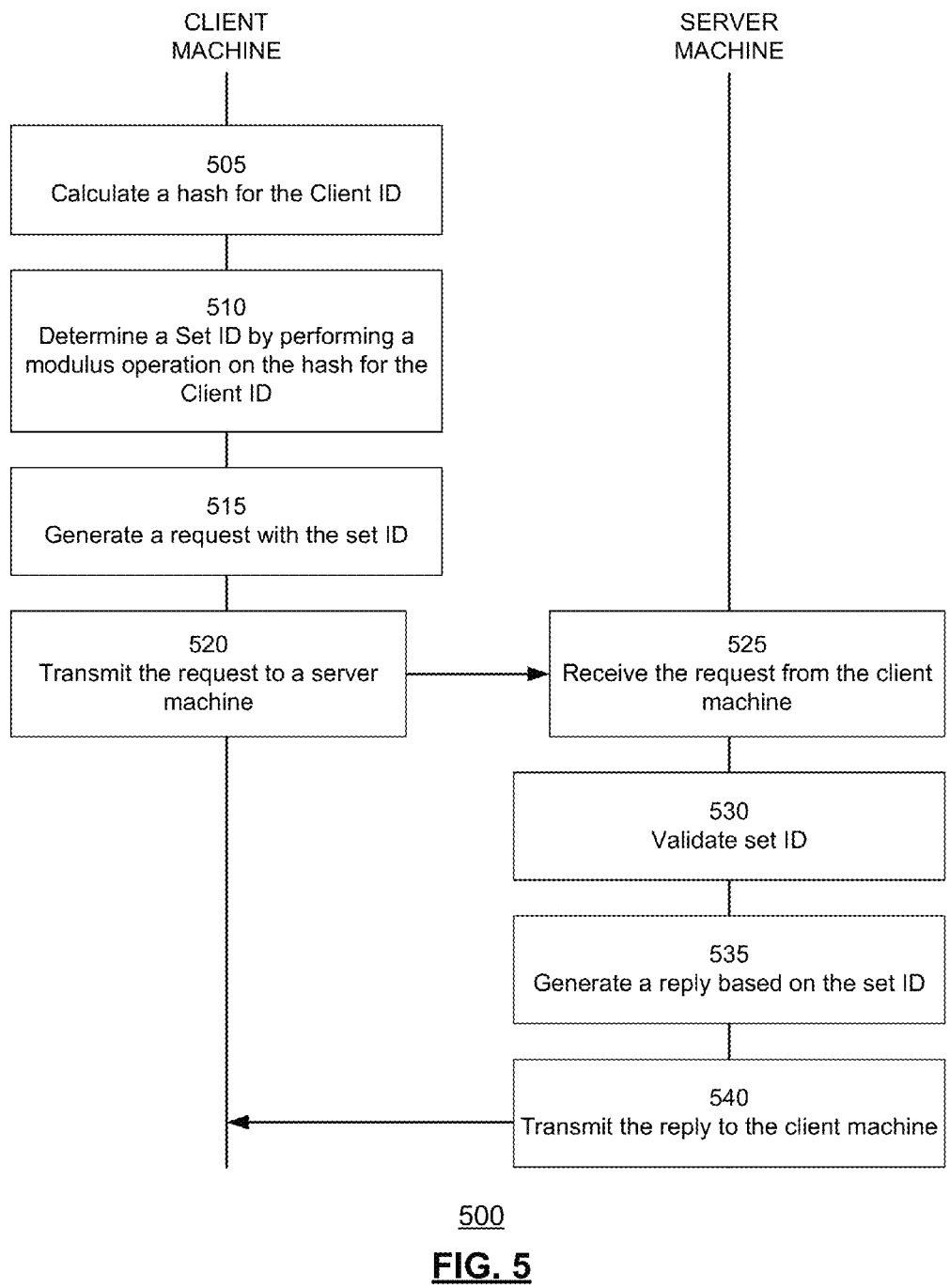
FIG. 5 is a flow diagram illustrating an example process for communicating between a client machine and a server machine using a set identifier, in accordance with various aspects of the subject technology.

FIG. 5 is a flow diagram illustrating an example process 500 for communicating between a client machine and a server machine using a set identifier, in accordance with various aspects of the subject technology. Although the steps in process 500 are shown and described in a particular order, certain steps, including steps not shown, may be performed in different orders or at the same time.

A client machine may have access to a client identifier associated with the client machine or a user of the client machine. For example, a client identifier (e.g., the serial number) may be stored on the client machine when the client machine is manufactured or transmitted to the client machine during another process.

The client machine may use the client identifier to determine the set identifier that will be used to communicate with a server machine. For example, at step 505, the client machine may calculate a hash by running a hash function on the client machine's client identifier. At step 510, the set identifier may be determined by performing a modulus operation on the hash based on a number of sets (e.g., an expected total number of sets).

At step 515, the client machine may generate a communication that includes the set identifier (e.g., the set ID) and transmit the communication to a server machine at step 520. The communication may be a request for instructions, a request for information needed for a particular process, or any other communication. The communication may also include additional data that may be used to validate the set identifier such as, as will be discussed in further detail below, an expected total number of sets or the modulus value used to determine the set identifier. In another example, the communication may be the set identifier itself.

At step 525, the server machine may receive the communication from the client machine and validate the set identifier. In some cases, the set identifier for the client machine may no longer be valid because the set identifier may have been generated based on an expected number of sets that is no longer current. For example, the server machine may have increased the number of sets used because of a growing number of client identifiers being tracked by the server machine (e.g., the number of sets may have increased from 16 to 32).

The server machine may reassign client identifiers to the increased number of sets using a larger modulus (e.g., 32) based on the increased number of sets. However, the modulus used by the client machine to calculate the set identifier may be still be based on an outdated number of sets (e.g., 16). Accordingly the set identifier for the client machine may no longer be current.

To validate the set identifier, at step 530, the server machine may compare the validating information received from the client machine (e.g., the modulus value that the client machine used to determine the set identifier) with validating information stored at the server machine (e.g., the modulus number in use by the server machine).

If validating information does not match, the set identifier received from the client machine is most likely invalid. In response, the server machine may transmit an updated modulus to the client machine. The client machine may recalculate the set identifier using the updated modulus and transmit the recalculated set identifier to the server machine.

On the other hand, if the modulus number received from the client machine and the modulus number in use by the server machine match, the set identifier received from the client machine is most likely valid and, at step 535, the server machine may generate a reply communication based on the set identifier.

At step 540, the server machine may transmit the reply communication to the client machine. The reply communication may also be sent to a number of other client machines associated with the same set identifier. For example, if another client machine associated with the same set identifier initiates communication with the server machine, the server machine may send the same reply communication to the other client machine because it is associated with the same set identifier.

The reply communication may include references to a number of client identifiers (e.g., hashes of the client identifiers or the client identifiers themselves) and messages corresponding to each of the references that enable a client machine associated with the client identifier to determine which message to use. The message may be used by the client machine for some other purpose or in another process being performed by the client machine.

In another aspect, the reply communication may include references to a number of client identifiers without any additional messages. Client machines may use the reply communication to determine, for example, whether the client machine belongs to a particular group of client machines, whether the client machine is associated with a particular characteristic, or whether the client machine is to execute a particular process.

According to some aspects, the reply communication may be used to include information that may be used to configure a client machine. For example, a manufacturer may make a number of client machines with the same system image (e.g., firmware, operating system, applications, etc.) and different serial numbers on the client machines, which may also be visible on packaging for the client machines. The system image may include different instructions or processes that may be able to configure each client machine in several different ways.

When the client machines are sold or distributed, they may be distributed as different versions. The different versions may include different levels (e.g., a "premium level," a "gold level," "silver level," or a "default level") or different types (e.g., an "enterprise version," a "personal version," etc.). A retailer or other distributor may scan or otherwise input the serial number for a client machine along with the appropriate version and send the information to a server machine (e.g., a configuration system).

When a client machine is powered on, the client machine may send a communication that includes a set identifier to the server machine. Based on the set identifier, the server machine will transmit a reply communication to the client machine that may be used by the client machine to determine which configuration instructions or processes to execute. For example, the reply communication may include a message that instructs the client machine to execute configuration instructions for a particular version.

In another example, the reply communication may include a list of references to serial numbers (e.g., hashes of serial numbers) for client machines of a particular version. If a reference to the client machine's serial number is included in the list, the client machine may execute configuration instructions for the particular version.

According to one aspect of the subject technology, by loading a single system image for a number of different versions, manufacturers may be able to simplify the design and manufacturing processes for client machines. Furthermore, the privacy of users of client machines may be protected by using a set identifier to communicate with the server machine instead of other identifying information.

Figure 6:
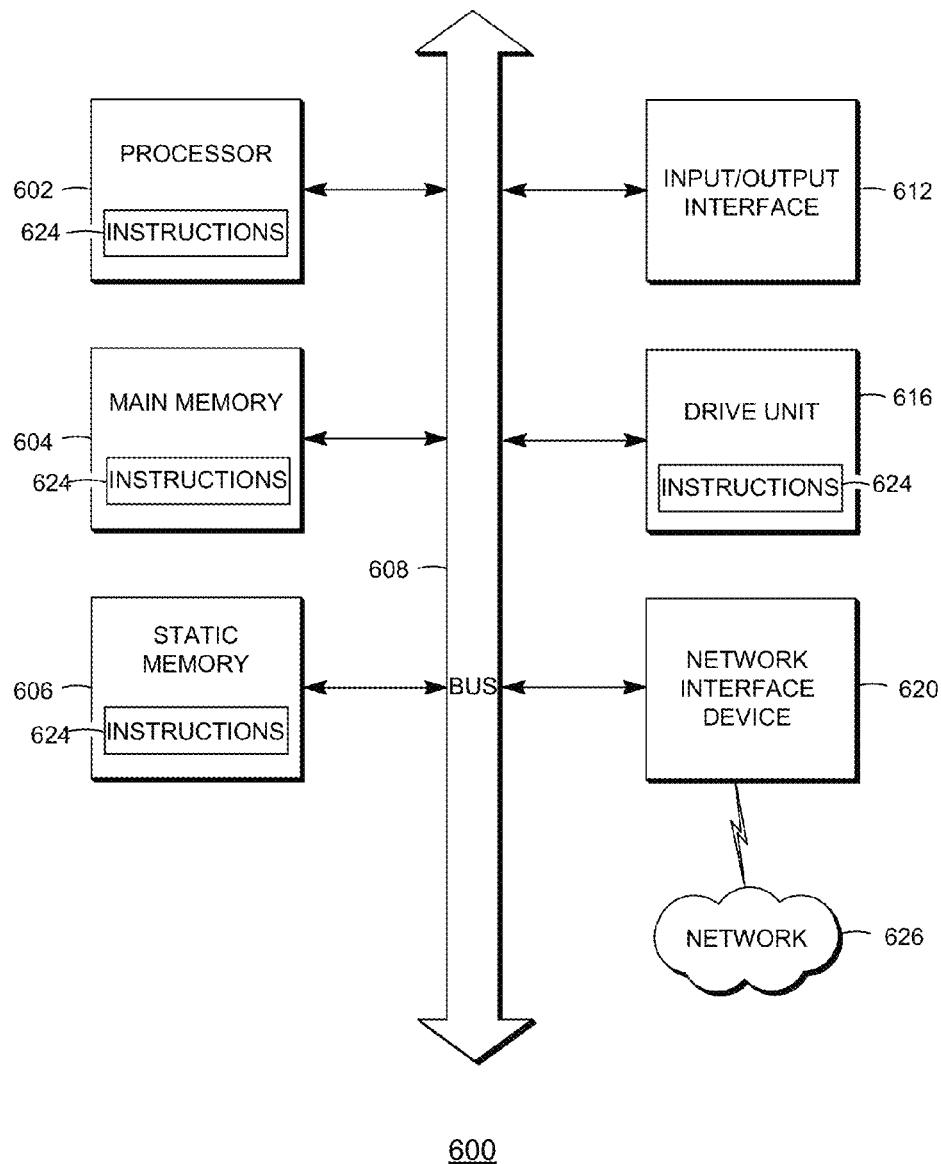
FIG. 6 is a block diagram illustrating an example computer system with which any of the clients and servers discussed may be implemented, in accordance with various aspects of the subject technology.

FIG. 6 is a block diagram illustrating an example computer system 600 with which any of the clients and servers discussed may be implemented, in accordance with various aspects of the subject technology. In certain aspects, the computer system 600 may be implemented using hardware or a combination of software and hardware, either in a dedicated server, or integrated into another entity, or distributed across multiple entities.

The example computer system 600 includes a processor 602, a main memory 604, a static memory 606, a disk drive unit 616, and a network interface device 620 which communicate with each other via a bus 608. The computer system 600 may further include an input/output interface 612 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 602 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 624 embodying any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media. The instructions 624 may further be transmitted or received over a network 626 via the network interface device 620.

The machine-readable medium may be a single medium or multiple media (e.g., a centralized or distributed database, and/or associated caches and servers) that store the one or more sets of instructions. The machine-readable medium may include the drive unit 616, the static memory 606, the main memory 604, the processor 602, an external memory connected to the input/output interface 612, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited. Furthermore, to the extent that the term "include," "have," or the like is used in the description, such term is intended to be inclusive in a manner similar to the term "comprise" as "comprise" is interpreted when employed as a transitional word in a claim.

What is claimed is:

1. A method comprising:
   retrieving a client identifier for a client device;
   calculating a hash value for the client identifier by performing a hashing function on the client identifier;
   generating a modulus result by performing a modulus operation on the hash value based on a number of client identifier sets, wherein each set of the client identifier sets is associated with a group of client identifiers;
   assigning the hash value of the client identifier to a set identifier that corresponds to the modulus result and one of the client identifier sets;
   receiving a request for configuration instructions from the client device, wherein the request comprises the set identifier and validation data associated with the number of client identifier sets used to generate the modulus result;
   validating the set identifier received from the client device by comparing the validation data with a number of client identifier sets in current use; and
   transmitting, upon successful validation and using the set identifier, configuration instructions to the client device and to one or more other client devices assigned to the set identifier,
   wherein the configuration instructions are transmitted together with a number of hash values or a number of client identifiers for the client device and the one or more other client devices assigned to the set identifier.

2. The method of claim 1, wherein the number of hash values or the number of client identifiers assigned to the set identifier correspond to client devices of a particular type.

3. The method of claim 2, wherein, upon receiving the configuration instructions, the client device is configured to execute a configuration process for the particular type.

4. The method of claim 1, wherein the client identifier is a serial number for the client device.

5. The method of claim 1, wherein the request for configuration instructions is received upon an initial configuration of the client device, the method further comprising:
selecting from one or more configuration instructions sets, configuration instructions associated with the set identifier in the request, prior to transmitting the configuration instructions to the client device.

6. The method of claim 1, wherein the configuration instructions comprise a plurality of entries, wherein each entry includes a hash value or client identifier and a message for a client device associated with the hash value or client identifier.

7. The method of claim 1, wherein the client identifier for the client device is from a distributor.

8. The method of claim 1, wherein the hashing function is a cryptographic hashing function.

9. A system comprising:
one or more hardware processors; and
a device-readable medium comprising instructions stored therein, which when executed by the one or more hardware processors, cause the one or more processors to perform operations comprising:
retrieving a client identifier for a client device;
calculating a hash value for the client identifier by performing a hashing function on the client identifier;
generating a modulus result by performing a modulus operation on the hash value based on a number of client identifier sets, wherein each of the client identifier sets is associated with a group of client identifiers;
assigning the hash value of the client identifier to a set identifier that corresponds to the modulus result and one of the client identifier sets;
receiving a request for instructions from the client device, wherein the request comprises the set identifier and validation data associated with the number of client identifier sets used to generate the modulus result;
validating the set identifier received from the client device by comparing the validation data with a number of client identifier sets in current use; and
transmitting, upon successful validation and using the set identifier, instructions to the client device and to one or more other client devices assigned to the set identifier,
wherein the instructions are transmitted together with a number of hash values or a number of client identifiers for the client device and the one or more other client devices assigned to the set identifier.

10. The system of claim 9, wherein the number of hash values or the number of client identifiers assigned to the set identifier correspond to client devices of a particular type.

11. The system of claim 10, wherein, upon receiving the instructions, the client device or the one or more other client devices are configured to execute a process for the particular type.

12. The system of claim 9, wherein the client identifier is a serial number for the client device.

13. The system of claim 9, wherein the operations further comprise:
selecting instructions based on the set identifier in the request, prior to transmitting the instructions to the client device.

14. The system of claim 9, wherein the instructions comprise a plurality of entries, wherein each entry includes a hash value or client identifier and a message for a client device associated with the hash value or client identifier.

15. The system of claim 9, wherein the instructions are configuration instructions.

16. A non-transitory machine-readable medium comprising instructions stored therein, which when executed by a device, cause the device to perform operations comprising:
retrieving a client identifier for a client device;
calculating a hash value for the client identifier by performing a hashing function on the client identifier;
generating a modulus result by performing a modulus operation on the hash value based on a number of client identifier sets, wherein each of the client identifier sets is associated with a group of client identifiers;
assigning the hash value of the client identifier to a set identifier that corresponds to the modulus result and one of the client identifier sets;
receiving a request for communication from the client device, wherein the request comprises the set identifier and validation data associated with the number of client identifier sets used to generate the modulus result;
validating the set identifier received from the client device by comparing the validation data with a number of client identifier sets in current use; and
transmitting, upon successful validation and using the set identifier, a communication to the client device and to the one or more other client devices assigned to the set identifier,
wherein the communication comprises a number of hash values or a number of client identifiers assigned to the set identifier.

17. The non-transitory machine-readable medium of claim 16, wherein the operations further comprise:
selecting the communication based on the set identifier in the request, prior to transmitting the communication to the client device.

18. The non-transitory machine-readable medium of claim 16, wherein the number of hash values or the number of client identifiers assigned to the set identifier correspond to client devices of a particular type.

19. The non-transitory machine-readable medium of claim 16, wherein the communication comprises a plurality of entries, wherein each entry includes a hash value or client identifier and a message for a client device associated with the hash value or client identifier.

20. The non-transitory machine-readable medium of claim 16, wherein the client identifier for the client device is from a server.

* * * * *